US012687264B2

(12) United States Patent
Wang

(10) Patent No.: US 12,687,264 B2
(45) Date of Patent: Jul. 21, 2026

(54) ADAPTOR DEVICE AND LAMP ASSEMBLY USING THE SAME

(71) Applicant: JIAXING SUPER LIGHTING ELECTRIC APPLIANCE CO., LTD, Jiaxing (CN)

(72) Inventor: Guangdong Wang, Jiaxing (CN)

(73) Assignee: JIAXING SUPER LIGHTING ELECTRIC APPLIANCE CO., LTD, Jiaxing City (CN)

( * ) Notice: Subject to any disclaimer, the term of this patent is extended or adjusted under 35 U.S.C. 154(b) by 63 days.

(21) Appl. No.: 18/850,076

(22) PCT Filed: Nov. 28, 2023

(86) PCT No.: PCT/CN2023/134559
§ 371 (c)(1),
(2) Date: Apr. 16, 2025

(87) PCT Pub. No.: WO2024/114608
PCT Pub. Date: Jun. 6, 2024

(65) Prior Publication Data

US 2026/0029095 A1 Jan. 29, 2026

(30) Foreign Application Priority Data

Dec. 1, 2022 (CN) ......................... 202211526219.6
Jan. 14, 2023 (CN) ......................... 202310064331.0
(Continued)

(51) Int. Cl.
*F21K 9/272* (2016.01)
*F21V 23/06* (2006.01)
*H01R 31/06* (2006.01)

(52) U.S. Cl.
CPC .............. *F21K 9/272* (2016.08); *F21V 23/06* (2013.01); *H01R 31/06* (2013.01)

(58) Field of Classification Search
CPC ......... F21K 9/275; F21K 9/272; H01R 33/18; H01R 33/06
See application file for complete search history.

(56) References Cited

U.S. PATENT DOCUMENTS 11,408,601 B1 * 8/2022 Lu .......................... F21K 9/272
2008/0031005 A1 2/2008 Liao
(Continued)

FOREIGN PATENT DOCUMENTS

CN 102088156 A 6/2011
CN 102506313 A * 6/2012 ............. F21K 9/272
(Continued)

OTHER PUBLICATIONS

Innovation Q+ NPL Search (Year: 2026).*

*Primary Examiner* — Anabel Ton
(74) *Attorney, Agent, or Firm* — Simon Kuang Lu

(57) ABSTRACT

An adaptor device includes a shell with a first end and a second end, which are arranged oppositely. The second end includes a second electric connector with an engaging head and a first receiving recess. The first end includes a first electric connector with a first plug and a second receiving recess. The first plug is disposed with a first through hole penetrating through the first electric connector. Part of a first conductive sheet is disposed in the first through hole and passes the shell from a side of the first electric connector to be extended to the second end and to stretch into the first receiving recess. Part of a second conductive sheet is disposed in the second receiving recess and passes the shell from a side of the first electric connector to be extended to the second end.

16 Claims, 12 Drawing Sheets

(30) Foreign Application Priority Data

| | | |
|---|---|---|
| Apr. 12, 2023 | (CN) | 202310407121.7 |
| May 12, 2023 | (CN) | 202310545239.6 |

(56) References Cited

U.S. PATENT DOCUMENTS

| | | | |
|---|---|---|---|
| 2017/0314741 | A1 | 11/2017 | Gleeson et al. |
| 2019/0346091 | A1 | 11/2019 | Zhang |

FOREIGN PATENT DOCUMENTS

| | | | |
|---|---|---|---|
| CN | 204285058 | U | 4/2015 |
| CN | 204785749 | U | 11/2015 |
| CN | 109268785 | A | 1/2019 |
| JP | 3236171 | U | 2/2022 |

* cited by examiner

A — A

ADAPTOR DEVICE AND LAMP ASSEMBLY USING THE SAME

BACKGROUND

Technical Field

The disclosure is related to lamps, particularly to an adaptor device and a lamp assembly using the same.

Related Art

Fluorescent lamps have been widely used in the lighting field for a long time. The core components of a fluorescent lamp are a glass tube and a filament. The inside of the tube is coated with fluorescent powder, and the filament is coated with a layer of electron-emitting material. A stem is used to fix the filament and ensure the sealing with the glass tube. The tube is filled with inert gas and mercury vapor. A traditional fluorescent lamp manufacturing process includes: making a glass tube; evenly coating the inner wall of the lamp tube with fluorescent powder; placing a stem to hold the filament; coating the filament with electronic slurry to make it with sufficient material to emit electrons; burning the stem and the tube to form a chamber with a fixed opening; removing the impurity gases in the tube and filling it with an appropriate amount of inert gas and mercury; separating excess parts from the main body of the tube; and installing a lamp head to form a final product. In fluorescent lamps, the lamp head generally uses a metal lamp head, and the lamp head and the tube are bonded with welding mud. The curing temperature of welding mud used in fluorescent lamps is generally 180-200° C., and the baking time is about two minutes. On the production line, the welding mud is first put into the metal lamp head, the lamp head is capped on ends of the tube, and then it is baked and heated by flames to the curing temperature of the welding mud to make it expand significantly, thereby achieving the effect of solidification after cooling. The advantage of using welding mud to connect the lamp head to the tube is very low costs. In fluorescent lamps, the reason why flame baking can be used to raise the temperature to 180-200° C. to solidify the welding mud is that this temperature will not cause damage to other components in the fluorescent lamp tube. The industrial production line of fluorescent lamps is now relatively mature, but due to fierce competition, its profit margins have been significantly reduced.

LED (light-emitting diode) is a solid-state semiconductor device that can directly convert electricity into light. LED energy-saving lamps use high-brightness white light-emitting diodes as a light source. They have high luminous efficiency, low power consumption, long lifespan, easy control, maintenance-free, safe, and environmentally friendly. They are a new generation of solid cold light sources with soft, bright and colorful light color. They have low energy consumption and are environmentally friendly. These lights are suitable for long-term use in homes, stores, banks, hospitals, hotels, restaurants and other public places. Flicker-free DC power which can protect eyes is the best choice for desk lamps and flashlights. An LED straight tube lamp generally includes a tube, a lamp board with a light source disposed in the tube and lamp heads disposed at both ends of the tube. The lamp head is disposed with power components. The light source and power components are electrically connected through the lamp board.

LED lamps are a form of lamps that have developed rapidly in recent years. Their light-emitting components use semiconductor light-emitting diodes. The existing technology requires an LED lamp with a simple structure, a small number of parts, high lighting efficiency, convenient heating of welding mud, fast curing speed, adaptability to industrial assembly line production, and high yield rate.

However, in the prior art, adaptor devices are connected with the lamp heads at both ends of the tube. The adaptor device is fixed by cooperating with the lamp holder. Only one end of the existing adaptor device could be connected with the lamp head. When it is necessary to work with different lamp holders, another adaptor device is needed. This made the cost of creating a lamp assembly high and greatly limited its adaptability.

Lamp assemblies are indispensable and important tools in people's daily lives. At present, as the use scenarios of lamp assemblies become more complex and diversified, higher demands are placed on their functionality. Currently, most lamp assemblies can only be adapted to a working condition with single power and single color temperature, and cannot meet the requirements of the lighting environment in different usage scenarios. In addition, the different sizes of the assembling components of the lamp assemblies make it impossible to guarantee the adaptability and reliability of the connection between lamp assemblies with the same size and assembling components with different sizes, affecting the practicality and reliability of the use of lamp assemblies.

Therefore, an adaptor device whose two ends can cooperate with a lamp head is needed to form a lamp assembly with improved functionality and lower operating costs.

SUMMARY

The disclosure provides a lamp assembly having simple structure, high functionality and high utility.

In an embodiment of the disclosure, an adaptor device includes

- a shell, having:
  - a first end, including a first electric connector, and the first electric connector including a first plug and a second receiving recess; and
  - a second end, arranged opposite to the first end, including a second electric connector, and the second electric connector including an engaging head and a first receiving recess;
  - wherein the first plug is disposed with a first through hole penetrating through the first electric connector, at least part of a first conductive sheet is disposed in the first through hole and passing through the shell from a side of the first electric connector and extending to the second end and into the first receiving recess, and
  - wherein at least part of a second conductive sheet is disposed in the second receiving recess and passing through the shell from a side of the second electric connector and extending to the second end and to the first end of the shell.

In another embodiment of the disclosure, the shell is a cylindrical structure, the first end and the second end of the shell are disposed with a first receiving chamber and a second receiving chamber, respectively, at least part of the first electric connector is disposed in the first receiving chamber, and at least part of the second electric connector is disposed in the second receiving chamber.

In yet another embodiment of the disclosure, the first electric connector includes a first base and a conductive end cap, and the conductive end cap caps on the first plug and electrically connects to the second electric connector.

In another embodiment of the disclosure, the second receiving recess penetrates through from the first base to the second electric connector, the second conductive sheet is extended from an end of the second receiving recess to another end of the second receiving recess, and two ends of the second conductive sheet are separately engaged with the first base and the engaging head.

In yet another embodiment of the disclosure, middles of the first plug and the engaging head are disposed with a first through hole which penetrates through, an end of the first conductive sheet is engaged with the second base, and another end of the first conductive sheet is engaged with the first plug, the first plug is formed with a cavity, and the first conductive sheet is extended from the cavity into the first through hole and the first receiving recess.

In still yet another embodiment of the disclosure, a lamp assembly includes:

a tube, disposed with lighting components therein;

a lamp head, disposed at ends of the tube, including a first lamp head and a second lamp head, the first lamp head being disposed with a circuit board electrically connected with the lighting components, and the second lamp head being disposed with a conductive pin electrically connected to the lighting components; and an adaptor device, connected to the lamp head, including a first electric connector and a second electric connector, and the first electric connector or second electric connector being electrically connected to a connecting structure of the lamp head;

wherein the first lamp head is further disposed with an adjusting assembly which is movable relative to the first lamp head to make the circuit board adjust output power and output color temperature of the lighting components.

In an embodiment of the disclosure, the adjusting assembly includes a first adjusting block and a second adjusting block, the circuit board is disposed with a first adjusting lever and a second adjusting lever;

wherein the first adjusting block is connected to the first adjusting lever, the first adjusting block is slidable relative to the first lamp head and drives the first adjusting lever to slide relative to the circuit board, so that the circuit board adjusts output power of the lighting components;

wherein the second adjusting block is connected to the second adjusting lever, the second adjusting block is slidable relative to the first lamp head and drives the second adjusting lever to slide relative to the circuit board, so that the circuit board adjusts output color temperature of the lighting components.

In another embodiment of the disclosure, the first lamp head is disposed with a first sliding trough, a bottom of the first sliding trough is disposed with a first sliding slot, the first adjusting block includes a first sliding portion and a first connecting portion fixed at an end of the first sliding portion, the first sliding portion is slidably connected to the first sliding trough, and the first connecting portion passes through the first sliding slot to extend into the first lamp head and connect with the first adjusting lever; the first lamp head is disposed with a second sliding trough, a bottom of the second sliding trough is disposed with a second sliding slot, the second adjusting block includes a second sliding portion and a second connecting portion fixed at an end of the second sliding portion, the second sliding portion is slidably connected to the second sliding trough, and the second connecting portion passes through the second sliding slot to extend into the first lamp head and connect with the second adjusting lever.

In yet another embodiment of the disclosure, an end of the first connecting portion, which is away from the first sliding portion, is formed with a first holding trough, two side walls of the first holding trough is capable of holding the first adjusting lever, an end of the second connecting portion, which is away from the second sliding portion, is formed with a second holding trough, and two side walls of the second holding trough is capable of holding the second adjusting lever.

In yet another embodiment of the disclosure, a side end of the shell, which is toward the tube, is disposed with two first receiving recesses at an interval, the first receiving recesses are used to accommodate the first conductive pin or the second conductive pin, a side end of the shell, which is away from the tube, is protrusively disposed with a first plug, the shell is formed with a first through hole, the first through hole passes from a side end toward the tube to an outer surface of the first plug, the electric connector is configured to be a first conductive sheet and a conductive end cap, the first conductive sheet includes a first conductive portion and a second conductive portion, the first conductive portion is connected to the second conductive portion, two ends of the first conductive portion separately correspond to the two first receiving recesses and are bent and extended into a corresponding one of the first receiving recesses with being in contact with the first conductive pin or the second conductive pin, the second conductive portion passes through the first through hole and is bent outward to be attached on an outer surface of the first plug, and the conductive end cap is fixedly capped on the first plug and is in contact with the second conductive portion.

In another embodiment of the disclosure, a side end of the shell, which is toward the tube, is formed with two second receiving recesses for accommodating the first conductive pin or the second conductive pin, the shell is formed with a second through hole which penetrates through the shell from a side end toward the tube to a side end which is away from the tube, the electric connector is configured to be two second conductive sheets, the second conductive sheets and the second receiving recesses are arranged correspondingly to each other, the second conductive sheet includes a third conductive portion, a fourth conductive portion and a fifth conductive portion, the fourth conductive portion penetrates through the second through hole, the third conductive portion is connected to a side of the fourth conductive portion, which is toward the tube, and is bent relative to the fourth conductive portion to stretch into the second receiving recess and be in contact with the first conductive pin or the second conductive pin, and the fifth conductive portion is attached on a side of the fourth conductive portion, which is away from the shell, and is bent relative to the fourth conductive portion to be attached on an outer surface of the shell.

An embodiment of the disclosure provides a lamp assembly, which includes:

a tube, each of two ends of the tube including a lamp head, at least one of the lamp heads including a power components, at least part of the power components being disposed in a receiving space of the lamp head, each lamp head including a connecting structure which complies with a first connection protocol, and one of the connecting structures being used to connect an external signal to the power element; and an adaptor device, connected with the connecting structure of the lamp head, complying with a second connection protocol, used for connecting a lamp holder component providing an external signal to make the external signal sent to the power components via the adaptor device and the connecting structure in order.

In an embodiment of the disclosure, a length of the lamp assembly complies with one of lamp size standards of USA-ANSI, Europe-IEC and Japan-210924-AC.

In an embodiment of the disclosure, the tube is disposed with a lighting components therein, the power components are electrically connected to the lighting components, and the external signal is transmitted to the lighting components through the power components.

In an embodiment of the disclosure, the connecting structure is a conductive pin protrusively disposed on the lamp head.

In an embodiment of the disclosure, the adaptor device includes a shell and an electric connector, an end of the electric connector is electrically connected to the conductive pin, and another end thereof stretches out of a surface of the shell.

In an embodiment of the disclosure, the adaptor device includes a first end and a second end, which are opposite, the first end and the second end are located on two sides of the shell, the electric connector includes a first electric connector and a second electric connector, the first electric connector is disposed on the first end, and the second electric connector is disposed on the second end.

In an embodiment of the disclosure, the lamp head is mechanically and electrically connected to the first electric connector or the second electric connector on the adaptor device through the connecting structure.

In an embodiment of the disclosure, the adaptor device is mechanically and electrically connected to the lamp holder component through the first electric connector or the second electric connector.

In an embodiment of the disclosure, the lamp head includes an adjusting assembly which is movable relative to the lamp head, and the adjusting assembly controls output power and output color temperature of the lighting components.

The embodiments of the present disclosure provide the following advantages.

In the lamp assembly provided by the disclosure, in some embodiments the first lamp head is disposed with a circuit board electrically connected to a lighting element. The first lamp head is disposed with an adjusting assembly which is movable relative to the first lamp head to make the circuit board adjust output power and output color temperature of the lighting element, so as to adjust power and color temperature of the lamp assembly in the lighting process to further meet the requirements of lighting environment in different use scenarios.

In addition, the lamp assembly provided by some embodiments further includes two adaptor devices, which are separately and detachably disposed on the first lamp head and the second lamp head. The adaptor device includes a shell and an electric connector. When the adaptor device is installed on the first lamp head, an end of the electric connector can be connected with the first conductive pin, and the other end can stretch out of a surface of the shell. The adaptor device can electrically connect the circuit between the first conductive pin and an external assembling element. When the adaptor device is installed on the second lamp head, an end of the electric connector can be connected with the second conductive pin, and the other end can stretch out of a surface of the shell. The adaptor device can electrically connect the circuit between the second conductive pin and an external assembling element. Thus, the connective adaptability and reliability between lamp assembling structures with different sizes can be further ensured, so that functionality of the whole lamp assembly can be further improved.

DETAILED DESCRIPTION

Figure 1:
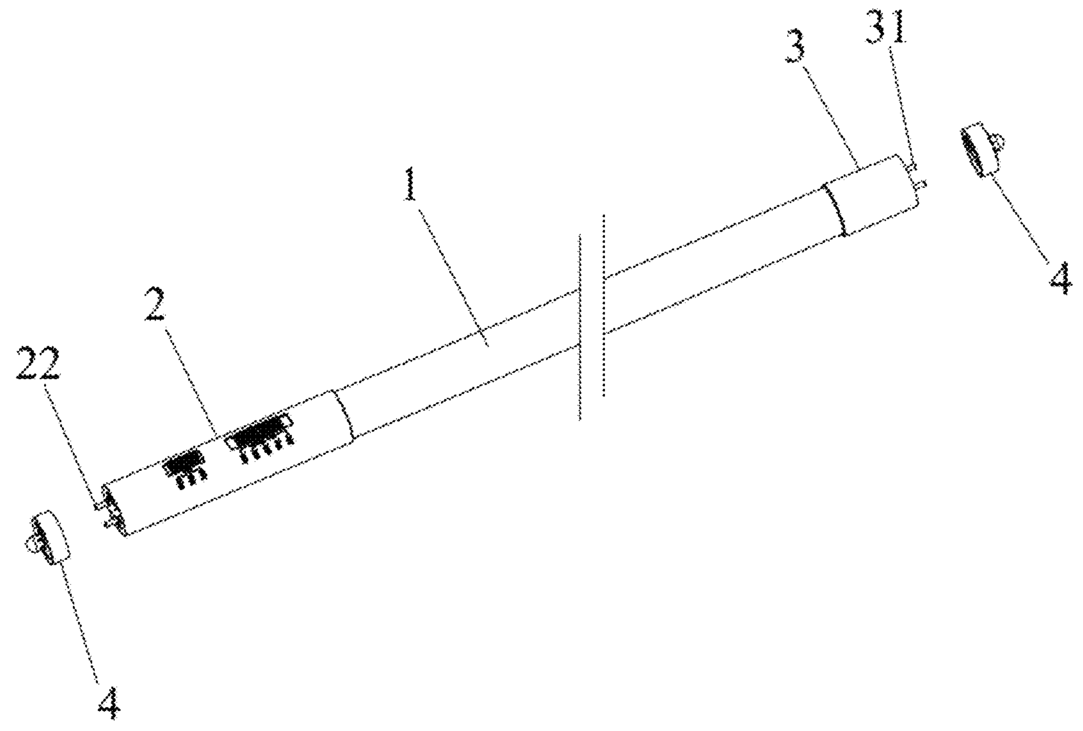
FIG. 1 is an exploded schematic view of the lamp assembly according to one embodiment of the present disclosure.
Figure 2:
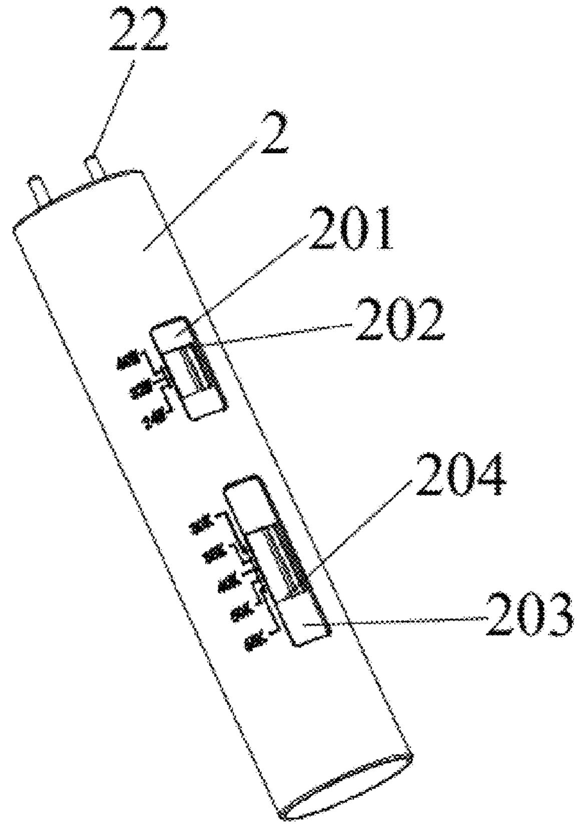
FIG. 2 is a partially structural schematic view of the first lamp head according to one embodiment of the present disclosure.
Figure 3:
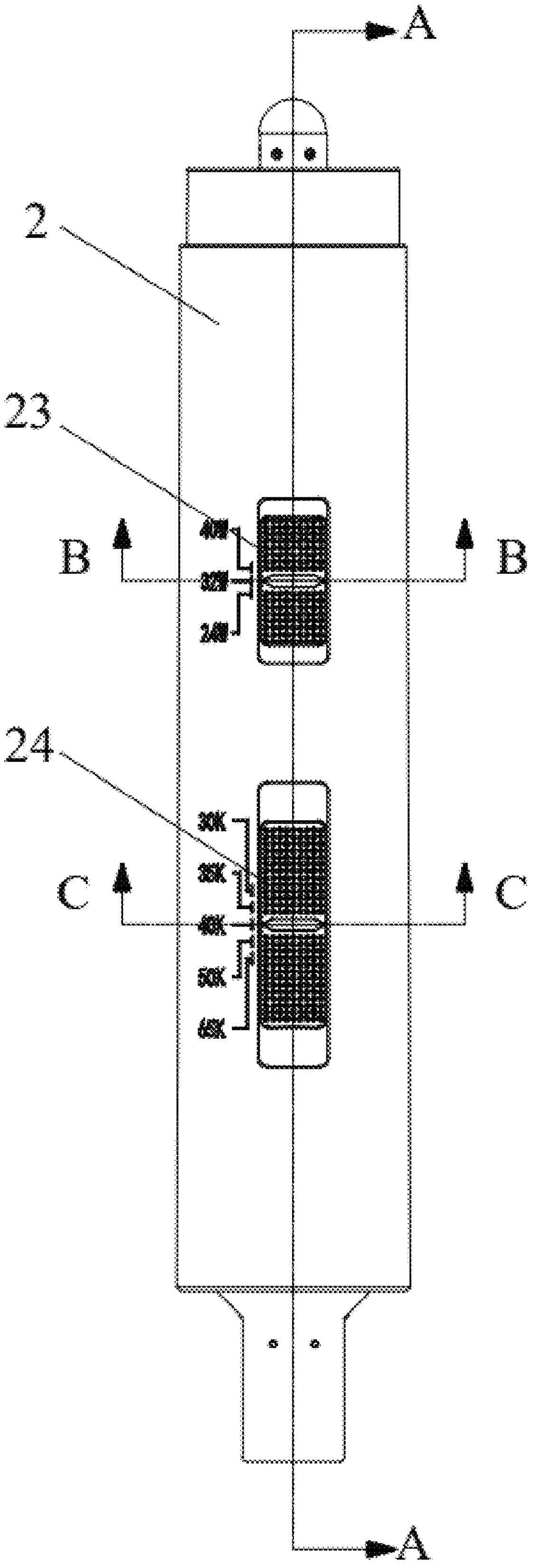
FIG. 3 is a structural schematic view of the first lamp head according to one embodiment of the present disclosure.

The present disclosure will be further described in detail below in conjunction with the accompanying drawings and embodiments. It can be understood that the specific embodiments described here are only used to explain the present disclosure, but not to limit the present disclosure. In addition, it should be noted that, for convenience of description, only some but not all structures related to the present disclosure are shown in the drawings.

In the description of this disclosure, unless otherwise explicitly stipulated and limited, the terms “connected”, “connect” and “fix” should be understood in a broad sense. For example, they can be a fixed connection, a detachable connection, an integral body, a mechanical connection, an electrical connection, a direct connection, an indirect connection through an intermediate medium, internal communication between two elements, or an interaction between two elements. For persons having ordinary skill in the art, the specific meanings of the above terms in this disclosure can be understood.

In this disclosure, unless otherwise explicitly stated and limited, a first feature “above” or “below” a second feature may include direct contact between the first and second features, or may also include non-direct contact between the first and second features but indirect contact through an additional feature between them. Furthermore, a first feature “above”, “over” or “on” a second feature includes the first feature being directly above and diagonally above the second feature, or simply means that the first feature is at a higher level than the second feature. A first feature “below” or “under” a second feature includes the first feature being directly below and diagonally below the second feature, or simply means that the first feature is at a lower level than the second feature.

In the description of this embodiment, the directional or positional terms “upper”, “lower”, “right”, etc. are based on the directional or positional relationship shown in the drawings, and are only for convenience of description and simplified operation, rather than expressing implying that the device or element referred to must have a specific direction or be constructed and operated in a specific direction. Therefore, they cannot be construed as a limitation to the present disclosure. In addition, the terms “first” and “second” are only used for descriptive purposes and have no special meaning.

Figure 4:
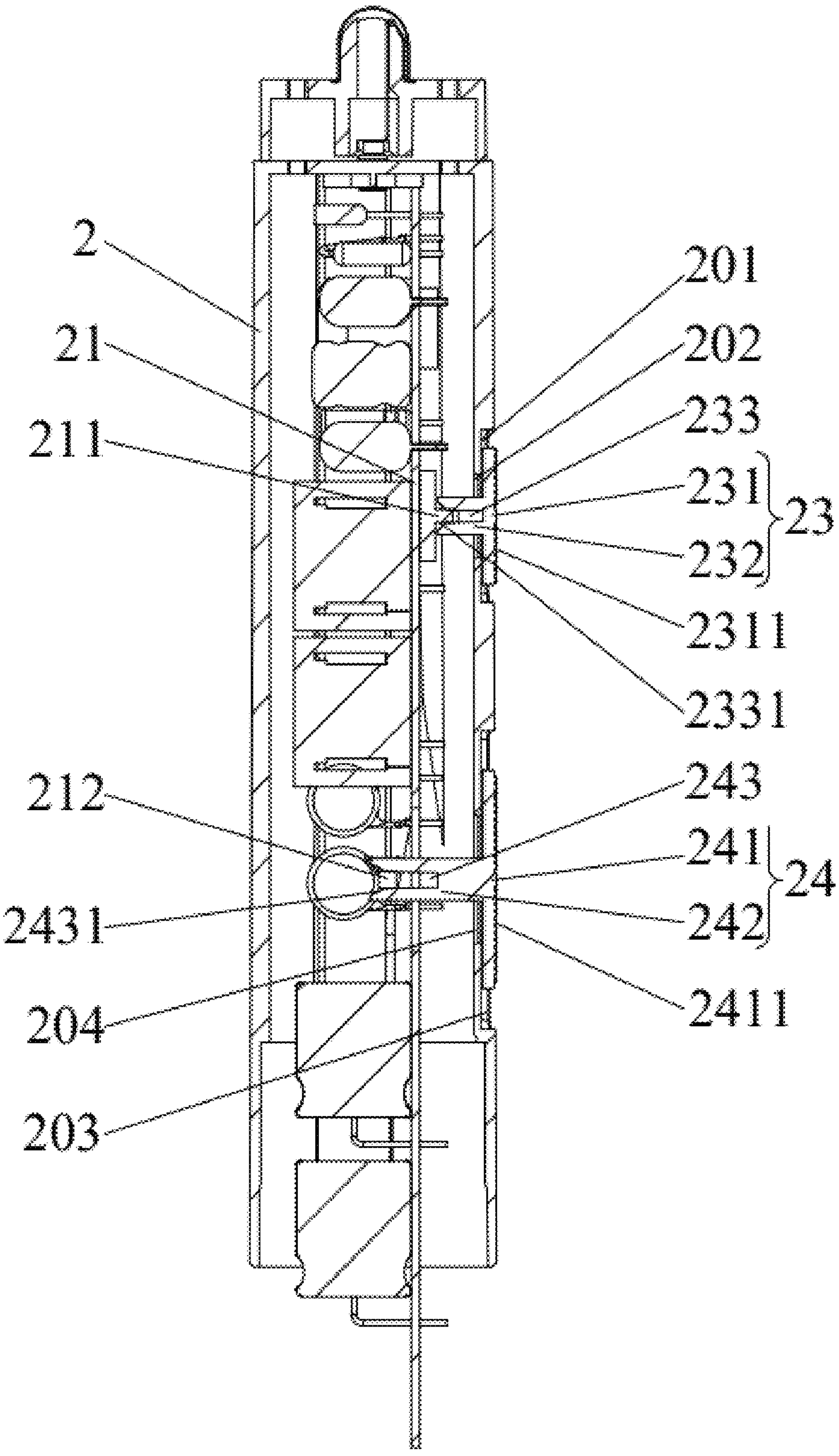
FIG. 4 is a cross-sectional view of line A-A in FIG. 3.
Figure 5:
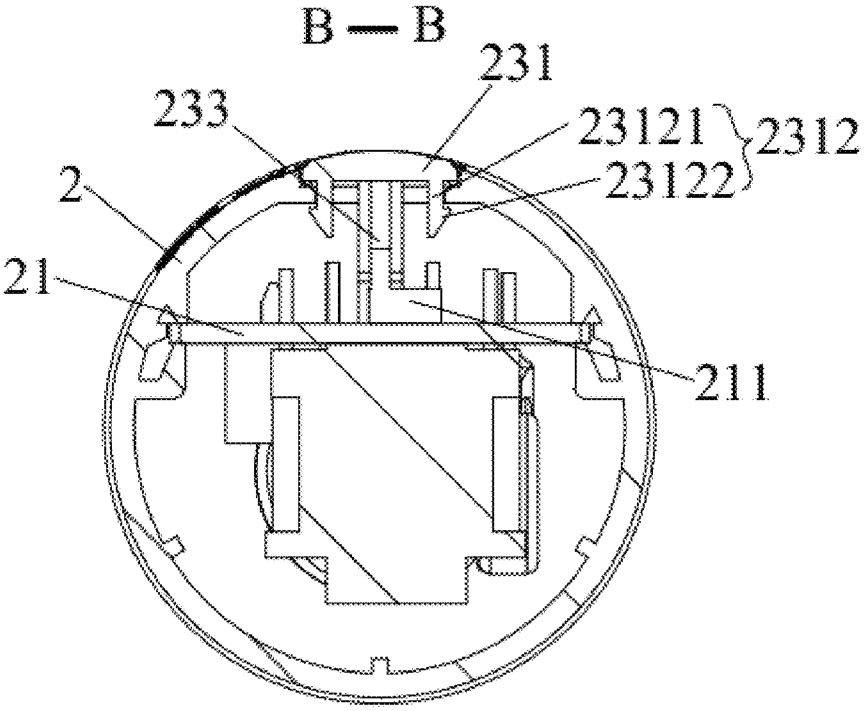
FIG. 5 is a cross-sectional view of line B-B in FIG. 3.
Figure 6:
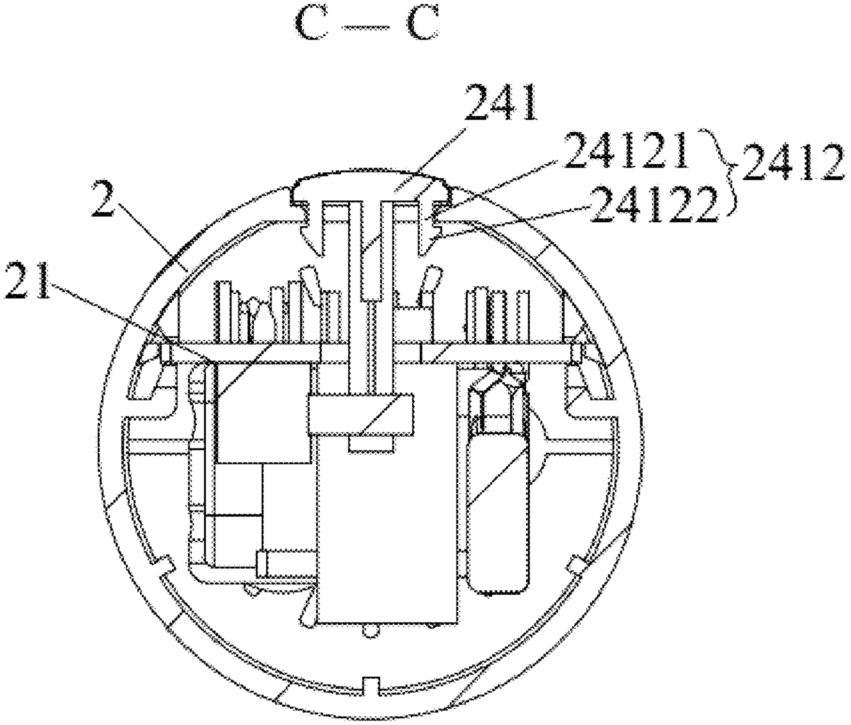
FIG. 6 is a cross-sectional view of line C-C in FIG. 3.
Figure 7:
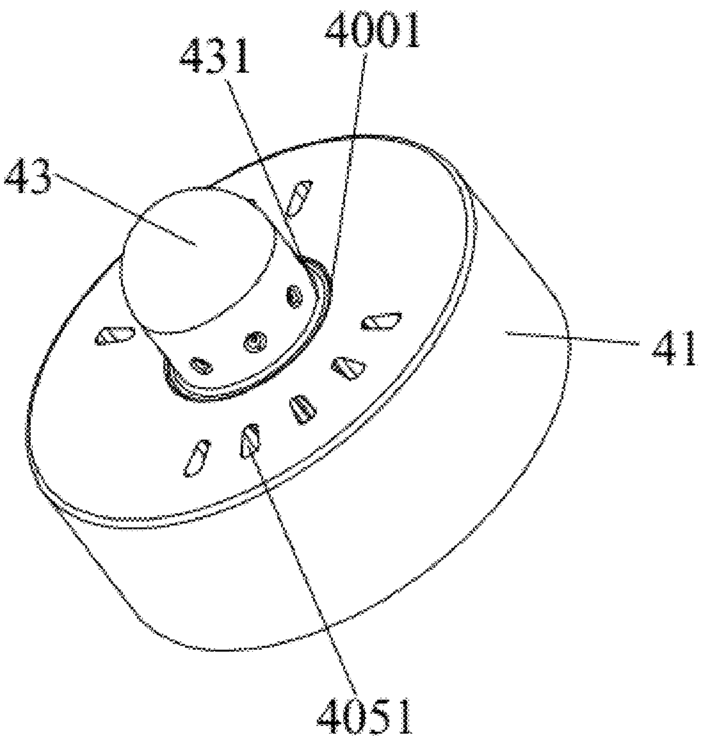
FIG. 7 is a structural schematic view of the first embodiment of the adaptor device according to one embodiment of the present disclosure.
Figure 8:
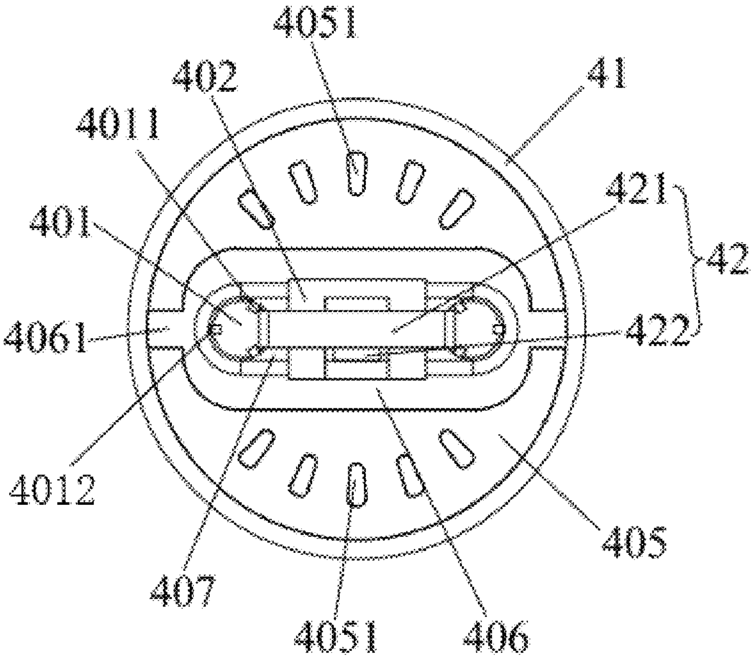
FIG. 8 is another structural schematic view of the first embodiment of the adaptor device according to one embodiment of the present disclosure.
Figure 9:
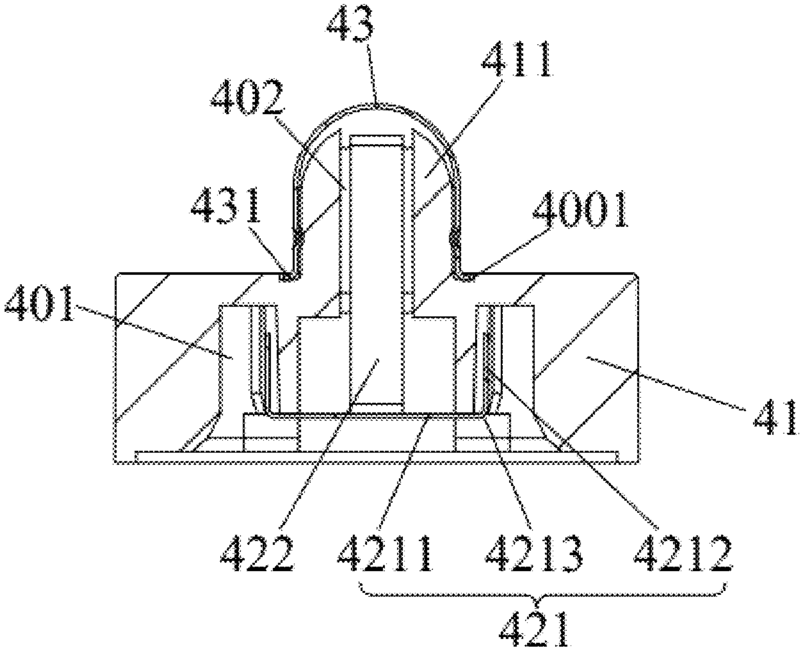
FIG. 9 is a cross-sectional view of the first embodiment of the adaptor device according to one embodiment of the present disclosure.
Figure 10:
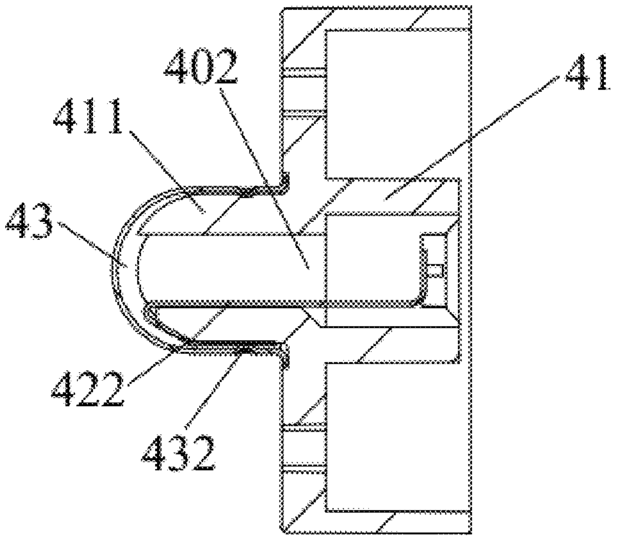
FIG. 10 is another cross-sectional view of the first embodiment of the adaptor device according to one embodiment of the present disclosure.
Figure 11:
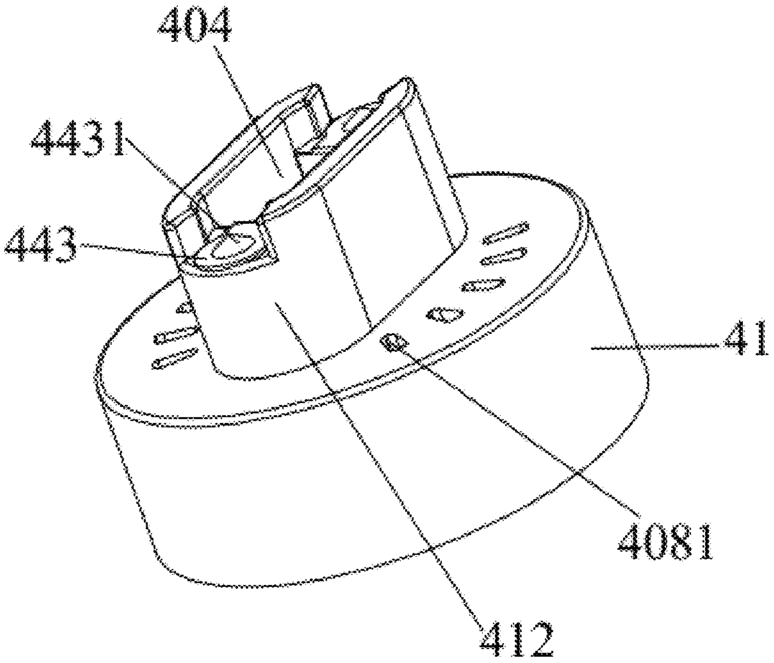
FIG. 11 is a structural schematic view of the second embodiment of the adaptor device according to one embodiment of the present disclosure.
Figure 12:
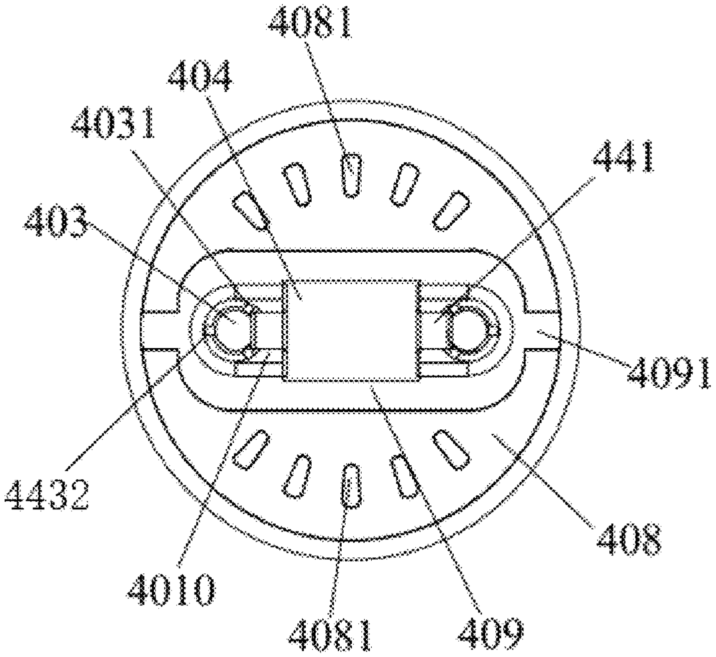
FIG. 12 is another structural schematic view of the second embodiment of the adaptor device according to one embodiment of the present disclosure.
Figure 13:
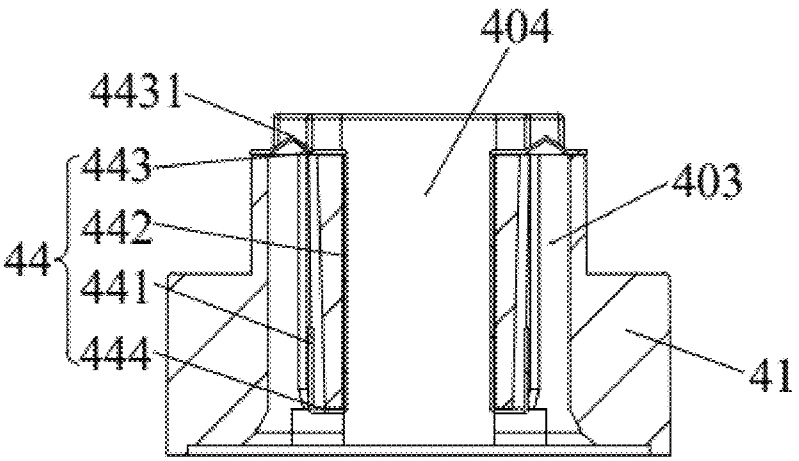
FIG. 13 is a cross-sectional view of the second embodiment of the adaptor device according to one embodiment of the present disclosure.
Figure 14:
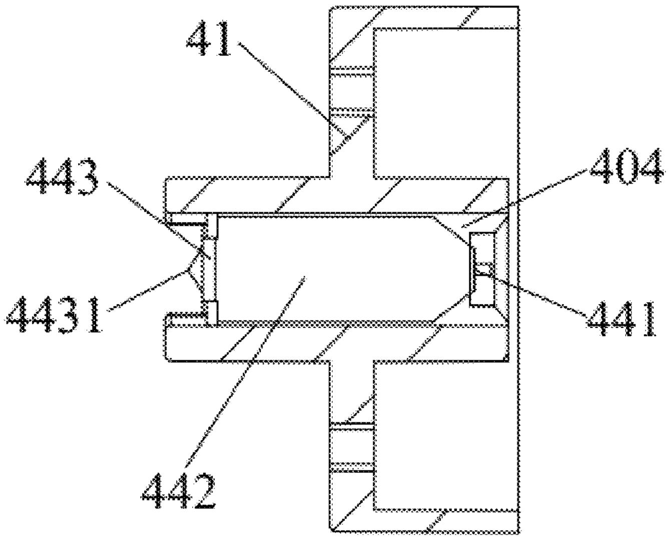
FIG. 14 is another cross-sectional view of the second embodiment of the adaptor device according to one embodiment of the present disclosure.

A lamp assembly is provided according to one embodiment of the present disclosure. Referring to FIGS. 1 and 4, the lamp assembly includes a tube 1 (also called lamp tube 1), a lamp head (a first lamp head 2 and a second lamp head 3) and an adaptor device 4. The inside of the tube 1 is disposed with lighting components. The lamp head is disposed at the ends of the tube 1, i.e., two ends of the tube 1. The lamp head includes a connecting structure which complies with a first connection protocol. In an embodiment, the connecting structure may be a conductive pin such as a first conductive pin or a second conductive pin. The lamp head includes a receiving space. At least one lamp head is disposed with power components therein. At least part of the power components are disposed in the receiving space. The power components at least includes a circuit board. The power components are electrically connected to the lighting components in the tube 1 (for example, connected to the lighting components through the circuit board. The connecting structure at least located at one end of the lamp assembly is used to connect or transmit external signals to the power components (further connected or transmitted to the lighting element). The first lamp head 2 is fixed at one end of the tube 1. The first lamp head 2 is disposed with a circuit board 21 electrically connected with the lighting components. The first lamp head 2 is protruded with a first conductive pin 22 electrically connected to the lighting components. The first lamp head 2 is disposed with an adjusting assembly which is movable relative to the first lamp head 2 to make the circuit board 21 (also the power components) adjust output power and output color temperature of the lighting element, for example, the outputs of color temperature and power can be implemented by controlling the external signals provided by a lamp holder component. The second lamp head 3 is fixed at the other end of the tube 1. The second lamp head 3 is protruded with a second conductive pin 31 electrically connected to the lighting components, i.e., the lamp head is protruded with a conductive pin structure. The lamp head (the first lamp head 2 and/or the second lamp head 3) is disposed with an adjusting assembly which is movable relative to the lamp head. Output power and output color temperature of the lighting components can be controlled by the adjusting assembly. In an embodiment, the lamp assembly may further include two adaptor devices 4. The two adaptor devices 4 are separately detachably disposed on the first lamp head 2 and the second lamp head 3. In some embodiments, the adaptor device 4 includes a shell 41 (referring to FIGS. 7 and 11) and an electric connector. An end of the electric connector can be electrically connected with the conductive pin (the first conductive pin 22 or the second conductive pin 31), and the other end can stretch out of a surface of the shell 41. That is, the adaptor device 4 is connected to the connecting structure of the lamp head to form an electric connection. And the connection between them both complies with a second protocol. At least one end of the lamp assembly is disposed with the adaptor device 4. That is, at least one lamp head (away from an end of the tube) is disposed with the adaptor device 4. The adaptor device 4 is used to connect the lamp holder component providing external signals. That is, the adaptor device 4 is connected to the lamp holder component to form an electric connection, and the external signals provided by the lamp holder component is transmitted to the lamp head connected with the adaptor device 4. That is, the external signals transmitted by the adaptor device 4 are received through the connecting structure (conductive pin) on the lamp head, and then are transmitted to the power element (or the lighting element). The external signals provided by the lamp holder component are transmitted to the connecting structure of the lamp head through the adaptor device 4. From there, they are transmitted to the power element through the connecting structure of the lamp head, and then are transmitted to the lighting components through the power components (the circuit board or components disposed on the circuit board).

In one embodiment, the adjusting assembly is movable relative to the first lamp head 2 to cause the circuit board 21 to adjust the output power and output color temperature of the lighting components. This allows for the adjustment of the power and/or color temperature of the lamp assembly during the lighting process to better meet the requirements of the lighting environment in various usage scenarios. In addition, the adaptor devices 4 are separately detachably disposed on the first lamp head 2 and the second lamp head 3. When the adaptor device 4 is disposed on the first lamp head 2, an end of the electric connector can be connected to the first conductive pin 22, and the other end thereof can stretch out of a surface of the shell 41. The circuit between the first conductive pin 22 and an external conductive assembling components can be electrically connected by the adaptor device 4. When the adaptor device 4 is disposed on the second lamp head 3, an end of the electric connector can be connected to the second conductive pin 31, and the other end thereof can stretch out of a surface of the shell 41. The circuit between the second conductive pin 31 and the external conductive assembling components can be electrically connected by the adaptor device 4. The connective adaptability and reliability between lamp assembling structures with different sizes can be further ensured by the adapting effect of the adaptor devices 4. This also enhances the connective adaptability and reliability between the lamp assembly and an external lamp seat, further improving the functionality of the whole lamp assembly.

Referring to FIGS. 2 to 6, the adjusting assembly includes a first adjusting block 23 and a second adjusting block 24, according to some embodiments. In some embodiments, the circuit board 21 is disposed with a first adjusting lever 211 and a second adjusting lever 212. The first adjusting block 23 is connected to the first adjusting lever 211. The first adjusting block 23 is slidable relative to the first lamp head 2 and drives the first adjusting lever 211 to slide relative to the circuit board 21. The first adjusting lever 211 may be connected to the elements controlling power to adjust output power of the lighting components of the circuit board 21 through the first adjusting block 23. The second adjusting block 24 is connected to the second adjusting lever 212. The second adjusting block 24 is slidable relative to the first lamp head 2 and drives the second adjusting lever 212 to slide relative to the circuit board 21. The second adjusting lever 212 may be connected to the components controlling color temperature to adjust output color temperature of the lighting components of the circuit board 21 through the second adjusting block 24.

According to some embodiments, the first lamp head 2 is disposed with a first sliding trough 201. The bottom of the first sliding trough 201 is disposed with a first sliding slot 202. The first adjusting block 23 includes a first sliding portion 231 and a first connecting portion 232 fixed at an end of the first sliding portion 231. The first sliding portion 231 is slidably connected to the first sliding trough 201. The first connecting portion 232 passes through the first sliding slot 202 to extend into the first lamp head 2 and connect with the first adjusting lever 211 so as to make the first adjusting block 23 be slidable in the first lamp head 2 and simultaneously drive the first adjusting lever 211 to slide together. The first lamp head 2 is disposed with a second sliding trough 203. The bottom of the second sliding trough 203 is disposed with a second sliding slot 204. The second adjusting block 24 includes a second sliding portion 241 and a second connecting portion 242 fixed at an end of the second sliding portion 241. The second sliding portion 241 is slidably connected to the second sliding trough 203. The second connecting portion 242 passes through the second sliding slot 204 to extend into the first lamp head 2 and connect with the second adjusting lever 212 so as to make the second adjusting block 24 be slidable in the first lamp head 2 and simultaneously drive the second adjusting lever 212 to slide together.

In some embodiments, a side of the first lamp head 2, which is adjacent to the first sliding trough 201, is further disposed with a scale of multiple power values. The scale of power values can correspond to power values of the first adjusting lever 211 at different positions. A side of the first lamp head 2, which is adjacent to the second sliding trough 203, is further disposed with a scale of multiple color temperature values. The scale of color temperature values can correspond to color temperature values of the second adjusting lever 212 at different positions.

Furthermore, an upper surface of the first sliding portion 231 is disposed with a first friction pattern 2311, according to some embodiments. An upper surface of the second sliding portion 241 is disposed with a second friction pattern 2411. The first friction pattern 2311 and the second friction pattern 2411 can increase the friction between a user's hand and the first and second sliding portions 231, 241. This ensures effective pushing of the first sliding portion 231 and the second sliding portion 241, allowing for reliable adjustment of output power and output color temperature.

With reference to FIGS. 2-6, an end of the first connecting portion 232, which is away from the first sliding portion 231, is formed with a first holding trough 233, according to one embodiment. Two side walls of the first holding trough 233 can hold the first adjusting lever 211. Two sides of the first holding trough 233 abut against ends of opposite sides of the first adjusting lever 211. That is, an interference fit is formed between the first holding trough 233 and the first adjusting lever 211 to ensure reliable fastening between the first adjusting block 23 and the first adjusting lever 211.

According to some embodiments, an end of the second connecting portion 242, which is away from the second sliding portion 241, is formed with a second holding trough 243. Two side walls of the second holding trough 243 can hold the second adjusting lever 212. Two sides of the second holding trough 243 abut against ends of opposite sides of the second adjusting lever 212. That is, an interference fit is formed between the second holding trough 243 and the second adjusting lever 212 to ensure reliable fastening between the second adjusting block 24 and the second adjusting lever 212.

Further, each of two opposite sides of the first holding trough 233 is disposed with a first guiding slopes 2331, according to some embodiments. The two first guiding slopes 2331 are arranged correspondingly to each other. The two first guiding slopes 2331 are aslant extended toward each other from outside to inside in the opening of the first holding trough 233. The two first guiding slopes 2331 can provide a guiding effect while the first holding trough 233 is holding the first adjusting lever 211 so as to make the first holding trough 233 able to hold the first adjusting lever 211 quickly and precisely.

Each of two opposite sides of the second holding trough 243 is disposed with a second guiding slopes 2431, according to one embodiment The two second guiding slopes 2431 are arranged correspondingly to each other. They are slanted and extended towards each other from outside to inside in the opening of the second holding trough 243. The two second guiding slopes 2431 provide a guiding effect while the second holding trough 243 holds the second adjusting lever 212, allowing for quick and precise holding of the second adjusting lever 212.

Furthermore, two sides of the first sliding portion 231 in the width direction of the first sliding slot 202 are correspondingly disposed with a first engaging element 2312, according to one embodiment. The first engaging element 2312 includes a first flexible connecting portion 23121 and a first engaging head 23122.

The first flexible connecting portion 23121 is connected with a lower end of the first sliding portion 231. The first engaging head 23122 is disposed on an end of the first flexible connecting portion 23121. The first flexible connecting portion 23121 passes through the first sliding trough 201 and the first sliding slot 202. This allows the first engaging head 23122 to slidably engage with inner walls of opposite sides of the first sliding slot 202, preventing the first adjusting block 23 from escaping from the first sliding slot 202 during sliding relative to the first sliding slot 202. This ensures reliable sliding of the first adjusting block 23.

Furthermore, two sides of the second sliding portion 241 in the width direction of the second sliding slot 204 are correspondingly disposed with a second engaging element 2412, according to some embodiments. The second engaging element 2412 includes a second flexible connecting portion 24121 and a second engaging head 24122. The second flexible connecting portion 24121 is connected with a lower end of the second sliding portion 241. The second engaging head 24122 is disposed on an end of the second flexible connecting portion 24121. The second flexible connecting portion 24121 passes through the second sliding trough 203 and the second sliding slot 204 to allow the second engaging head 24122 to be slidably engaged with inner walls of opposite sides of the second sliding slot 204. This prevents the second adjusting block 24 from escaping from the second sliding slot 204 during sliding relative to the second sliding slot 204, ensuring reliable sliding of the second adjusting block 24.

Referring to FIGS. 7-10, a side end of the shell 41, which is toward the tube 1, is disposed with two first receiving recesses 401 at an interval, according to other embodiments. The first receiving recesses 401 are used to accommodate the first conductive pin 22 or the second conductive pin 31. A side end of the shell 41, which is away from the tube 1, is protrusively disposed with a first plug 411. The shell 41 is formed with a first through hole 402. The first through hole 402 passes from a side end toward the tube 1 to an outer surface of the first plug 411. The end of the shell 41 that is away from the tube 1 is referred to as the first end, while the end of the shell 41 that is toward the tube 1 is referred to as the second end. The first end and the second end are arranged opposite to each other. The electric connector includes a first conductive sheet 42 and a conductive end cap 43, according to some embodiments. An interference fit with contact is formed between the first conductive sheet 42 and the conductive end cap 43 to form an electric connection therebetween. The first conductive sheet 42 includes a first conductive portion 421 and a second conductive portion 422. The first conductive portion 421 is connected to the second conductive portion 422. The two ends of the first conductive portion 421 each correspond to one of the two first receiving recesses 401. They are bent and extended into the respective first receiving recesses 401, making contact with the first conductive pin 22 or the second conductive pin 31. This forms an electric connection between the first conductive portion 421 and the first conductive pin 22 or the second conductive pin 31. The second conductive portion 422 passes through the first through hole 402 and then is bent outward to be attached on an outer surface of the first plug 411. The conductive end cap 43 is fixedly capped on the first plug 411 and is in contact with the second conductive portion 422 so as to form an electric connection between the conductive end cap 43 and the second conductive portion 422. In some embodiments, the electric connector consists of multiple connectors, such as a first electric connector, a second electric connector, and so on.

Furthermore, the first conductive portion 421 includes a first body 4211 and first bend ends 4212, according to one embodiment. The second conductive portion 422 is connected to the first body 4211. The first bend ends 4212 are correspondingly disposed on two sides of the first body 4211. A first bend portion 4213 is formed between the first body 4211 and the first bend end 4212 to form a transition. In another embodiment, the first bend portion 4213 may be a folded angle structure or a round angle structure.

When the first conductive pin 22 or the second conductive pin 31 is inserted into the first receiving recess 401, a first side of the first conductive portion 421 abuts against an inner wall of the first receiving recess 401, and a second side of the first conductive portion 421 abuts against the first conductive pin 22 or the second conductive pin 31. This ensures that the first conductive portion 421 is securely fixed and makes close contact between the first conductive portion 421 and the first conductive pin 22 or the second conductive pin 31 to ensure good electrical contact.

Furthermore, an inner wall of the first receiving recess 401 is disposed with a first guiding limiting rib 4011 extended toward the depth direction of the first receiving recess 401, according to some embodiments. The first guiding limiting rib 4011 is configured to be the same as the extended direction of an end of the first conductive portion 421 which has been bent in the first receiving recess 401 for guiding, and can press and fix the first conductive portion 421, according to some embodiments.

The number of the first guiding limiting rib 4011 is two, according to some embodiments. The bend end of the first conductive portion 421 is fixed between the two first guiding limiting ribs 4011 so as to simultaneously guide two sides of the first conductive portion 421.

The first guiding limiting rib 4011 may adopt a material with elastic deformation, such as plastic or resin, so as to fix the first conductive pin 22 or the second conductive pin 31, which is inserted into the first receiving recess 401 to ensure connective stability between the first conductive pin 22 or the second conductive pin 31 and the adaptor device 4. Moreover, the inner wall of the first receiving recess 401 may be disposed with a first limiting fixing rib 4012 located at a right or substantially middle position between the two first guiding limiting ribs 4011, according to some embodiments. The first limiting fixing rib 4012 fixes the first conductive pin 22 or the second conductive pin 31.

A side end of the shell 41, which is away from the tube 1, is formed with a fixing recess 4001 on the bottom of the first plug 411, according to some embodiments. The bottom of the conductive end cap 43 is outward folded to form a fixing inserting portion 431 which is fixed and inserted in the fixing recess 4001 when the conductive end cap 43 is capped on the first plug 411. In some embodiments, an interference fit is formed between the fixing inserting portion 431 and the fixing recess 4001 to ensure reliably fixing of the conductive end cap 43.

Further, a side end of the conductive cap 43, which is adjacent to the first plug 411, is inward dented to form a contact head 432 disposed correspondingly to the second conductive portion 422, according to some embodiments. The contact head 432 can perform effective contact with the second conductive portion 422 when the conductive end cap 43 is fixedly capped on the first plug 411.

In some embodiments, the first conductive portion 421 and the second conductive portion 422 are integrally formed into one piece. Besides, the first conductive portion 421 and the second conductive portion 422 may also be connected by insertion, soldering, etc. In other embodiments, the first conductive portion 421 and the second conductive portion 422 are made of metal material, for example, the first conductive portion 421 is made of copper, gold, silver or aluminum. In still other embodiments, the first conductive portion 421 and the second conductive portion 422 are made of the same material.

In another embodiment of the disclosure, the first conductive portion 421 and the second conductive portion 422 are made of different materials, i.e., the first conductive portion 421 and the second conductive portion 422 at least include two materials.

Further, a side end of the shell 41, which is toward the tube 1, is formed with a first sinking recess 405. The bottom of the first sinking recess 405 is disposed with a first protrusion 406. The first protrusion 406 is formed with a second sinking recess 407. Both the first receiving recess 401 and the first through hole 402 are disposed in the bottom of the second sinking recess 407.

A first reinforcement rib 4061 is disposed between walls of the first protrusion 406 and the first sinking recess 405, according to some embodiments. The first reinforcement rib 4061 can effectively connect the first protrusion 406 with the first sinking recess 405 to further ensure structural strength of the shell 41. In some embodiments, the amount of the first reinforcement rib 4061 is configured to be multiple. The multiple first reinforcement ribs 4061 are arranged along a peripheral direction of the first protrusion 406.

In some embodiments, the amount of the first reinforcement ribs 4061 is configured to be two.

Furthermore, the bottom of the first sinking recess 405 is formed with a first vent 4051. The first vent 4051 can cool the inside of the shell 41 of the adaptor device 4 and reduce the weight of the overall structure of the shell 41.

In some embodiments, the amount, position and shape of the first vent 4051 can be adaptively adjusted according to the requirements of cooling and lightweighting. In some embodiments, the amount of the first vent 4051 is configured to be multiple. The multiple first vents 4051 are arranged along a peripheral direction of the shell 41. The shape of the first vent may be elongated, circular, square, triangular, arcuate or others.

An end of the adaptor device 4 described in the above embodiment, which is away from the tube 1, implements contact and electric connection between illuminators in the tube 1 and an external conductive assembling component through the first conductive sheet 42 and the conductive end cap 43 in order.

Referring to FIGS. 11-14, a side end of the shell 41, which is toward the tube 1, is formed with two second receiving recesses 403 for accommodating the first conductive pin 22 or the second conductive pin 31, according to some embodiments. The shell 41 is formed with a second through hole 404 which penetrates through from a side end toward the tube 1 to a side end which is away from the tube 1. The electric connector is configured to be two second conductive sheets 44. The second conductive sheets 44 and the second receiving recesses 403 are arranged correspondingly to each other. The second conductive sheet 44 includes a third conductive portion 441, a fourth conductive portion 442 and a fifth conductive portion 443. The fourth conductive portion 442 penetrates through the second through hole 404. The third conductive portion 441 is connected to a side of the fourth conductive portion 442, which is toward the tube 1, and is bent relative to the fourth conductive portion 442 to stretch into the second receiving recess 403 and be in contact with the first conductive pin 22 or the second conductive pin 31 so as to implement an electric connection between the third conductive portion 441 and the first conductive pin 22 or the second conductive pin 31, i.e., an electric connection between the second conductive sheet 44 and the first conductive pin 22 or the second conductive pin 31. The fifth conductive portion 443 is attached on a side of the fourth conductive portion 442, which is away from the shell 41, and is bent relative to the fourth conductive portion 442 to be attached on an outer surface of the shell 41. In the embodiment, the fifth conductive portion 443 is bent relative to the fourth conductive portion 442 to be attached on an outer surface of the shell 41, so as to implement contact with an external conductive assembling component directly through the fifth conductive portion 443.

When the first conductive pin 22 or the second conductive pin 31 is inserted into the second receiving recess 403, a first side of the third conductive portion 441 abuts against an inner wall of the second receiving recess 403, while the second side of the third conductive portion 441 abuts against the first conductive pin 22 or the second conductive pin 31. This ensures that the third conductive portion 441 is securely fixed and there is a close contact between the first conductive pin 22 or the second conductive pin 31 and the third conductive portion 441, guaranteeing an electric connection. Furthermore, an inner wall of the second receiving recess 403 is disposed with a second guiding limiting rib 4031 extended and arranged along the depth direction of the second receiving recess 403, according to some embodiments. The second guiding limiting rib 4031 is configured to be substantially the same as the extended direction of an end of the third conductive portion 441 which has been bent in the second receiving recess 403 for guiding, and can press and fix the third conductive portion 441.

The amount of the second guiding limiting rib 4031 is configured to be two, according to some embodiments. The bend end of the third conductive portion 441 is fixed between the two second guiding limiting ribs 4031 so as to simultaneously guide two sides of the third conductive portion 441.

The second guiding limiting rib 4031 may adopt a material with elastic deformation, such as plastic or resin, so as to fix the first conductive pin 22 or the second conductive pin 31, which is inserted into the second receiving recess 403 to ensure connective stability between the first conductive pin 22 or the second conductive pin 31 and the adaptor device 4. Moreover, the inner wall of the second receiving recess 403 may be disposed with a second limiting fixing rib 4432 located at a right or substantially middle position between the two second guiding limiting ribs 4031. The second limiting fixing rib 4432 fixes the first conductive pin 22 or the second conductive pin 31.

The third conductive portion 441, the fourth conductive portion 442 and the fifth conductive portion 443 may be integrally formed into one piece. Besides, the second conductive portion 441, the fourth conductive portion 442 and the fifth conductive portion 443 may also be connected by insertion, soldering, etc. In some embodiments, the third conductive portion 441, the fourth conductive portion 442 and the fifth conductive portion 443 are made of copper, i.e., the second conductive sheet 44 is made of copper.

Further, a side of the shell 41, which is away from the tube 1, is protrusively disposed with a second plug 412, according to some embodiments. The second through hole 404 which penetrates through from a side end toward the tube 1 to an outer surface of the second plug 412. The fifth conducive portion 443 is bent relative to the fourth conductive portion 442 and attached on an outer surface of the second plug 412.

A side of an outer surface of the fifth conductive portion 443, which is back to the second plug 412, is protrusively disposed with a conductive contact 4431. An end of the adaptor device 4 described in the above embodiment, which is away from the tube 1, by arranging two third conductive sheets 44 to make the fifth conductive portion 443 attached on an outer surface of the second plug and the conductive contact 4431 and an external conductive assembling component be in contact with each other and be electrically connected through the conductive contact 4431.

The third conductive portion 441 and the fourth conductive portion 442 are bent through a second bend portion 444 as a transition. The second bend portion 444 may be a folded angle structure or a round angle structure, according to some embodiments.

A side end of the shell 41, which is toward the tube 1, is formed with a third sinking recess 408. The bottom of the third sinking recess 408 is disposed with a second protrusion 409. The second protrusion 409 is formed with a fourth sinking recess 4010. Both the second receiving recess 403 and the second through hole 404 are disposed in the bottom of the fourth sinking recess 4010.

A second reinforcement rib 4091 is disposed between walls of the second protrusion 409 and the third sinking recess 408. The second reinforcement rib 4091 can effectively connect the second protrusion 409 with the third sinking recess 408 to further ensure structural strength of the shell 41. In some embodiments, the amount of the second reinforcement rib 4091 is configured to be multiple. The multiple second reinforcement ribs 4091 are arranged along a peripheral direction of the second protrusion 409.

In another embodiment, the amount of the second reinforcement ribs 4091 is configured to be two.

Furthermore, the bottom of the third sinking recess 408 is formed with a second vent 4081. The second vent 4081 can cool the inside of the shell 41 of the adaptor device 4 and reduce the weight of the overall structure of the shell 41.

In other embodiments, the amount, position and shape of the second vent 4081 can be adaptively adjusted according to the requirements of cooling and lightweighting. In one embodiment, the amount of the second vent 4081 is configured to be multiple. The multiple second vents 4081 are arranged along a peripheral direction of the shell 41. The shape of the second vent may be elongated, circular, square, triangular, arcuate or others.

Figure 15:
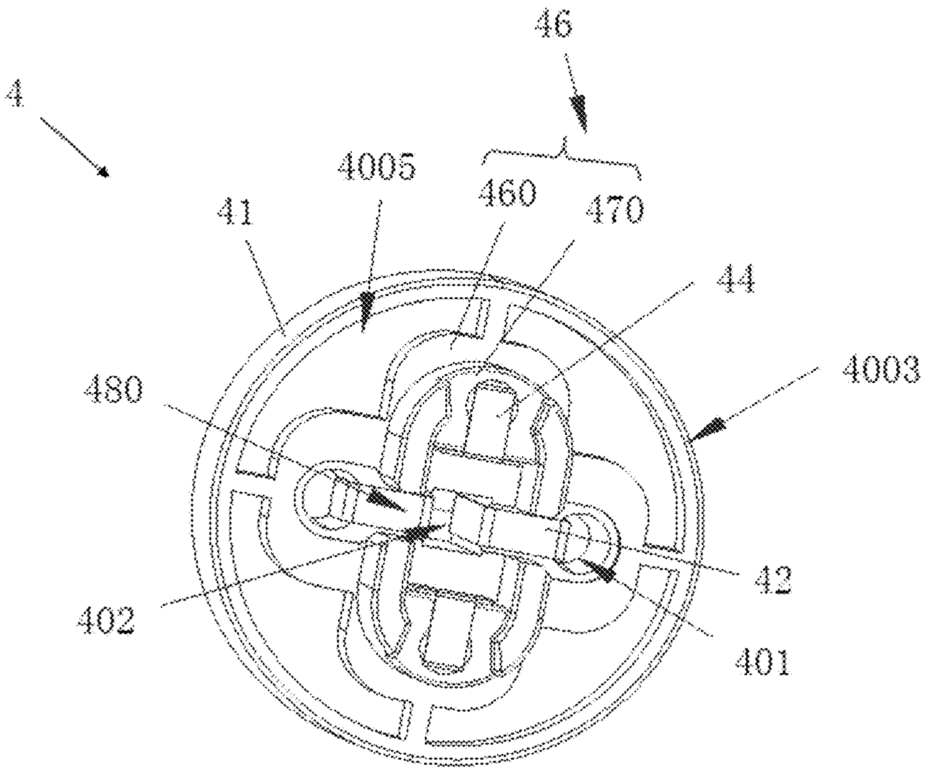
FIG. 15 is a structural schematic view of the adaptor device according to one embodiment of the present disclosure.
Figure 16:
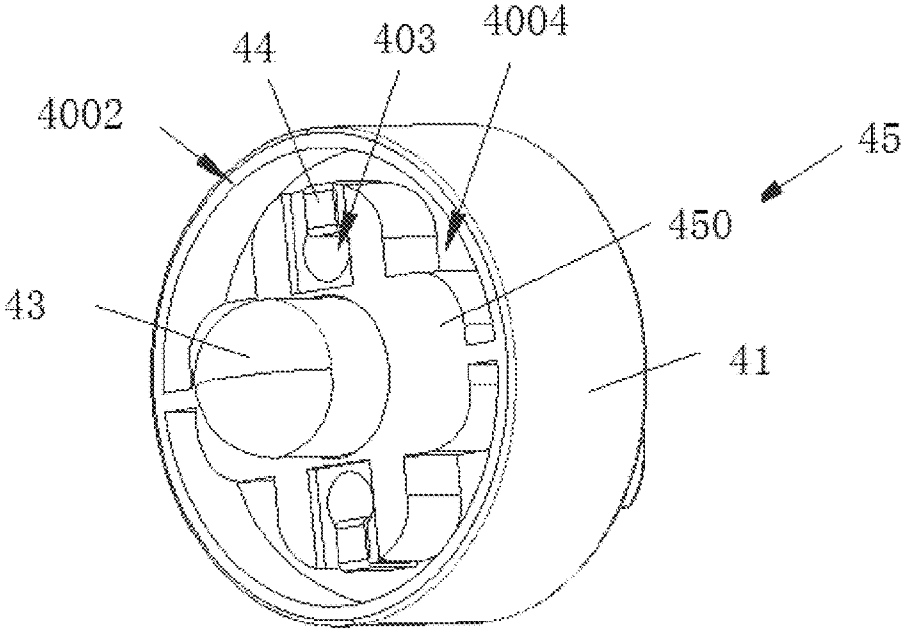
FIG. 16 is another structural schematic view of the adaptor device according to one embodiment of the present disclosure.
Figure 17:
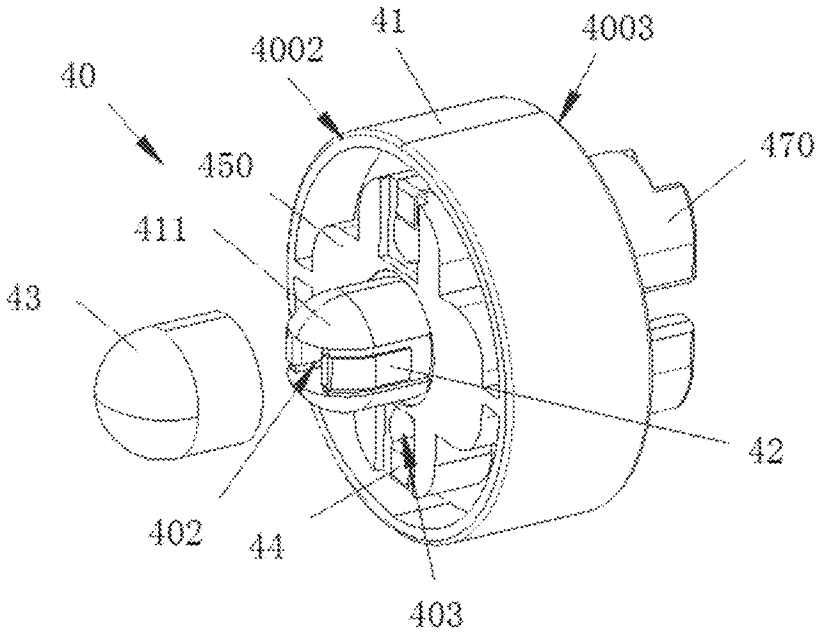
FIG. 17 is a partially exploded schematic view of the adaptor device according to one embodiment of the present disclosure.

Referring to FIGS. 15-17, an adaptor device 4 includes a shell 41, according to an embodiment of the present disclosure. The shell 41 has a first end 4002 and a second end 4003, which are opposite to one another. The first end 4002 and the second end 4003 are located on different sides of the shell 41, i.e., two sides of the shell 41. The adaptor device 4 further includes an electric connector. The electric connector may include a first electric connector and a second electric connector. The first electric connector 45 is disposed on the first end 4002 of the adaptor device 4 and disposed with a second receiving recess 403. The second receiving recess 403 is at least one in number (or multiple). In an embodiment of the disclosure, the second receiving recess 403 may be configured to be two in number and they are symmetrically arranged along the central axis of the adaptor device 4. The shell 41 is a tubular structure in some embodiments. The first end 4002 and the second end 4003 are dented toward the middle of the shell 41 to form a first receiving chamber 4004 and a second receiving chamber 4005, respectively. The second electric connector 46 is disposed on the second end 4003 of the adaptor device 4. That is, at least part of the second electric connector 46 is received in the second receiving chamber 4005. The second electric connector 46 is disposed with a first receiving recess 401. The first receiving recess 401 may be configured to be two in number and they are symmetrically arranged along the central axis of the adaptor device 4. It is noted that the second receiving recess 403 and first receiving recess 401 are interlacedly arranged in the peripheral direction of the adaptor device 4. In one embodiment, the second receiving recess 403 and the first plug 411 are located on the same side, and the first receiving recess 401 is located on the opposite side. The second receiving recess 403 is a through hole. An end of the first receiving recess 401 is closed, and the other end is open.

At least part of a second conductive sheet 44 is disposed in the second receiving recess 403, according to some embodiments. The second conductive sheet 44 passes the adaptor device 4 from a side of the first electric connector 45 to be extended to the second end 4003 of the adaptor device 4. At least part of a first conductive sheet 42 is disposed in the first receiving recess 401.

The first conductive sheet 42 passes the adaptor device 4 from a side of the second electric connector 46 to be extended to the first end 4002 of the adaptor device 4. In one embodiment, the first electric connector 45 and second electric connector 46, which are separately disposed at two ends of the adaptor device 4 and can cooperate with different lamp holders, satisfy various requirements, reduce using costs and simplify production management. In some embodiments, the adaptor device 4 may use the first electric connector 45 or the second electric connector 46 to implement an electric connection with the lamp head 2 so as to make the outermost electric connector of a lamp present different types. Both the first electric connector 45 and the second electric connector 46 can be electrically connected with conductive pins of a lamp. That is, the first conductive pin 22 and/or the second conductive pin 31 can be electrically connected with the first receiving recess 401 and/or the second receiving recess 403, i.e., the conductive pin is inserted into the receiving recess. Both the first electric connector 45 and the second electric connector 46 may be mechanically and electrically connected to a connecting structure on a lamp head or a lamp holder component, according to some embodiments. When the first electric connector 45 is connected to the connecting structure on a lamp head, i.e., the first electric connector 45 is directed to the tube 1, the corresponding second electric connector 46 is directed to a direction which is away from the tube 1 and may be mechanically and electrically connected to the lamp holder component. When the second electric connector 46 is connected to the connecting structure on a lamp head, i.e., the second electric connector 46 is directed to the tube 1, the corresponding first electric connector 45 is directed to a direction which is away from the tube 1. That is, when using the lamp assembly and one of the first electric connector 45 and the second electric connector 46 is connected to the lamp head, the other electric connector is connected to the lamp holder component. That is, when one of the first electric connector 45 and the second electric connector 46 is directed to the tube 1, the other electric connector is directed to a direction which is away from the tube 1.

When the lamp head is mechanically and electrically connected to the first electric connector 45 or the second electric connector 46 on the adaptor device 4 through the connecting structure, the first electric connector 45 or the second electric connector 46 on the adaptor device 4 is mechanically and electrically connected to the lamp holder component and transmits external signals provided by the lamp holder component to the adaptor device 4, the connecting structure and the power component in order.

Further, as shown in FIGS. 15 and 16, the adaptor device 4 appears to be a cylindrical structure. The first end 4002 of the adaptor device 4 is disposed with a first receiving chamber 4004 and the second end 4003 of the adaptor device 4 is disposed with a second receiving chamber 4005. In one embodiment, each of the first receiving chamber 4004 and the second receiving chamber 4005 is a receiving recess. At least part of the first electric connector 45 is received in the first receiving chamber 4004. At least part of the second electric connector 46 is received in the second receiving chamber 4005.

Further, as shown in FIGS. 16 and 17, the first electric connector 45 includes a first base 450, a first plug 411 and a conductive end cap 43, according to one embodiment of the present disclosure. In one embodiment, when an inner diameter of the conductive end cap 43 is 7.56 mm and an outer diameter of the first plug 411 is 7.23 mm, the conductive end cap 43 can be directly tightly capped on the first plug 411 without additional adhesion. The first base 450 has a shape of a cross. Edges of the first base 450 appears smooth. The first base 450 is connected to an inner wall of the first receiving chamber 4004 through several connecting ribs. The first base 450 is connected to the first end 4002 of the adaptor device 4. The first plug 411 is connected to an end of the first base 450, which is away from the adaptor device 4. The conductive end cap 43 is capped on the first plug 411 and electrically connected with the first conductive sheet 42. Part or all of the first base 450 is located in the first receiving chamber 4004. Part of the first plug 411 is located in the first receiving chamber 4004 or all of the first plug 411 is located outside the first receiving chamber 4004. In one embodiment, all of the first base 450 is located in the first receiving chamber 4004 and all of the first plug 411 is located outside the first receiving chamber 4004. In other embodiments, the first conductive sheet 42 possesses certain elastic and slightly outward protrudes along the radial direction of the first plug 411 to make the first conductive sheet 42 on the first plug 411 slightly exceed its inner diameter along the radial direction of the conductive end cap 43. During assembly, the conductive end cap 43 forms an interference fit with the first conductive sheet 42 on the first plug 411. This causes the conductive end cap 43 to press the first conductive sheet 42, resulting in elastic deformation and generating an outward restoration force from the inner wall of the conductive end cap 43. As a result, the first conductive sheet 42 abuts against and presses the inner wall of the conductive end cap 43. This process creates a close connection between the conductive end cap 43 and the first plug 411 without requiring any additional fixture structure or material.

Further, as shown in FIG. 15, the second electric connector 46 includes a second base 460 and an engaging head 470. The second base 460 appears to be a cross. Edges of the second base 460 appears smooth. The second base 460 is connected to an inner wall of the second receiving chamber 4005 through several connecting ribs. The second base 460 is connected to the second end 4003 of the adaptor device 4. The engaging head 470 is connected to an end of the second base 460, which is away from the adaptor device 4. Part or all of the second base 460 is located in the second receiving chamber 4005. Part of the engaging head 470 is located in the second receiving chamber 4005 or all of the engaging head 470 is located outside the second receiving chamber 4005. In one embodiment, all or part of the second base 460 is located in the second receiving chamber 4005 and all or part of the engaging head 470 is located outside the second receiving chamber 4005.

Moreover, as shown in FIGS. 15 and 16, the second receiving recess 403 penetrates through from the first base 450 to the second electric connector 46. The second conductive sheet 44 is extended from an end of the second receiving recess 403 to the other end of the second receiving recess 403. Two ends of the second conductive sheet 44 are separately engaged with the first base 450 and the engaging head 470. The second conductive sheet 44 is made of conductive or metal material such as copper, silver, gold, aluminum or iron, according to some embodiment.

Further, as shown in FIGS. 15 and 16, the middles of the first plug 411 and the engaging head 470 are disposed with a first through hole 402 which penetrates through. An end of the first conductive sheet 42 is engaged with the second base 460, and the other end of the first conductive sheet 42 is engaged with the first plug 411. The first plug 411 is formed with a cavity 480. The first conductive sheet 42 is extended from the cavity 480 into the first through hole 402 and the first receiving recess 401. The first conductive sheet 42 is made of metal material such as copper so as to enhance the effect of electric connection.

The disclosure further provides a lamp including the adaptor device 4, the tube 1, two lamp heads and a power component. The lamp heads include a first lamp head 2 and a second lamp head 3 (not shown) The amount of the power component is at least one. That is, at least one lamp head is disposed with the power component.

Further, as shown in FIGS. 18-21, an end of the first lamp head 2 (or the second lamp head 3 (not shown) has a receiving space. In an embodiment, the receiving space may be an accommodating chamber 207. The power components are disposed in the accommodating chamber 207 of the first lamp head 2 (or the second lamp head 3 (not shown)), or at least part of the power components are disposed in the accommodating chamber 207. Two ends of the tube 1 are separately connected to the lamp heads, i.e., a first lamp head 2 and a second lamp head 3, and electrically connected to the power components in the first lamp head 2 and/or the second lamp head 3. An end of the first lamp head 2, which is away from the accommodating chamber 207, is disposed with an engaging recess 206 communicating with the accommodating chamber 207 or being dented. The engaging recess 206 may be engaged with the first plug 411 or the conductive end cap 43 (engaging head 470). An end of the first lamp head 2, which is disposed with the engaging recess 206, is disposed with the first conductive pin 22. The first conductive pin 22 is electrically connected to the power element. The first conductive pin 22 is two hollow conductive pins which correspond to the second receiving recess 403 or the first receiving recess 401 in position.

Figure 18:
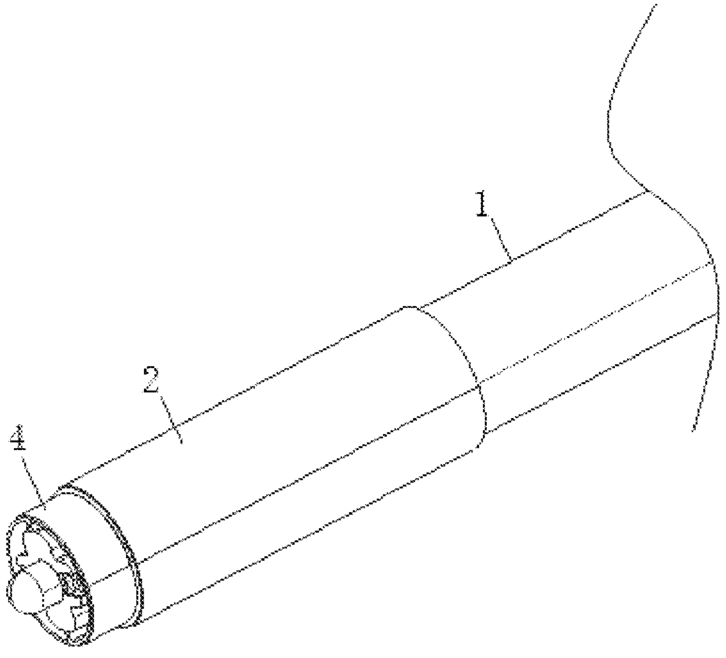
FIG. 18 is a partially structural schematic view of the first lamp according to one embodiment of the present disclosure.
Figure 19:
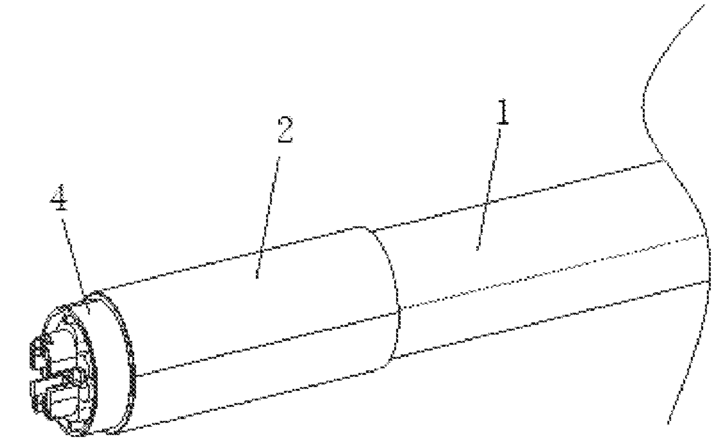
FIG. 19 is a partially structural schematic view of the second lamp according to one embodiment of the present disclosure.
Figure 20:
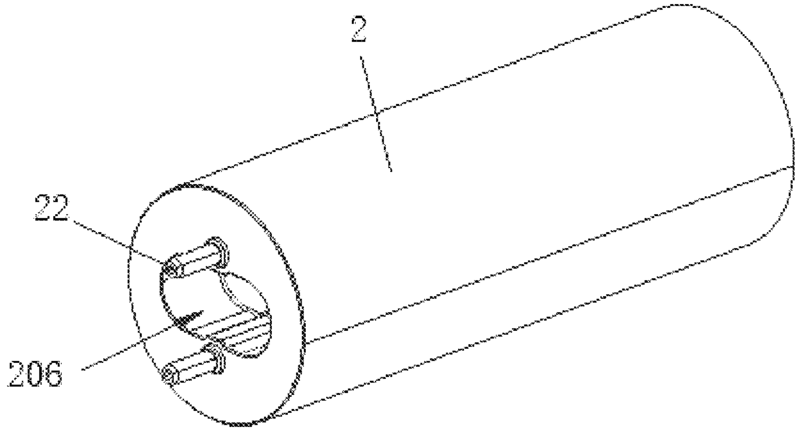
FIG. 20 is a structural schematic view of the lamp head according to one embodiment of the present disclosure.

FIGS. 18 and 19 are structural schematic views of the first lamp head 2 in association with the same adaptor device 4, which adapts to the R17D and Fa8 lamp holder to reduce the usage costs. The lamp holder is not shown in the figures.

In FIG. 19, when the engaging recess 206 associates with the first electric connector 45, i.e., when the first plug 411 is inserted into the engaging recess 206, the first conductive pin 22 is used to be inserted into the second receiving recess 403 to be electrically connected with the second conductive sheet 44. The engaging head 470 may be a plug engaged into an R17D lamp holder. Part of the second conductive sheet 44, which is located on the engaging head 470, is electrically connected to a connector of the R17D lamp holder.

In FIG. 18, when the engaging recess 206 associates with the second electric connector 46, i.e., when the engaging head 470 is inserted into the engaging recess 206, the first conductive pin 22 is used to be inserted into the first receiving recess 401 to be electrically connected with the first conductive sheet 42. After the conductive end cap 43 is engaged into an Fa8 lamp holder, the conductive end cap 43 is electrically connected to a connector in the Fa8 lamp holder.

As aforementioned mentioned, at least one lamp head includes a connecting structure (i.e., a conductive pin such as a first conductive pin or a second conductive pin). The connecting structure complies with a first connection protocol. At least one connecting structure of the lamp head may be fixed to the adaptor device 4 by the aforementioned manner (such as insertion) to implement an electric connection and signal transmission. The adaptor device 4 may be fixed in lamp holder components with different types by the engaging head 470 or the conductive end cap 43 to be fixed with the lamp holder component. They both comply with a second connection protocol to implement an electric connection and signal transmission. The adaptor device 4 is connected to the lamp holder component and transmits the external signals provided by the lamp holder component to at least one connecting structure. The connecting structure further transmits the external signals to the power components. The power components use the circuit board to transmit the external signals to the lighting components or other electronic components so as to implement controlling the lamp assembly by external signals.

In one embodiment, an inner or outer surface of the tube 1 may be coated with an adhesive film so as to isolate the inside and the outside of the tube 1 after rupture to prevent fragments from falling dispersedly.

Figure 21:
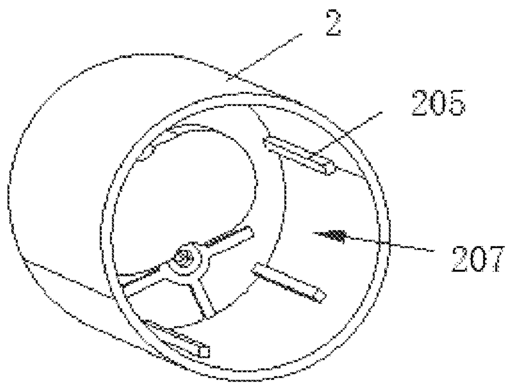
FIG. 21 is another structural schematic view of the lamp head according to one embodiment of the present disclosure.

Further, as shown in FIG. 21, an inner wall of the accommodating chamber 207 is disposed with multiple limiting ribs 205, according to one embodiment. The limiting ribs 205 are distributed on the inner wall of the accommodating chamber 207 at regular or irregular intervals. After the tube 1 is inserted, the end abuts against the limiting ribs 205. The tube 1 and the lamp head (the first lamp head 2, the second lamp head 3) can be fixedly connected by hot-melt adhesive, engagement or soldering.

In the embodiment, the lamp head (the first lamp head 2, the second lamp head 3) can be made of any material which is not a good conductor without being limited to plastic or ceramic. Also, hot-melt adhesive is a composition and includes a material of welding mud powder. Its preferred ingredients are phenolic resin 2127 #, shellac, rosin, calcite powder, zinc oxide, ethanol, etc. In this embodiment, rosin is a tackifier that is soluble in ethanol but insoluble in water. This kind of hot-melt adhesive can change its physical state and expand significantly under high-temperature heating conditions to achieve a solidification effect, and the original viscosity of the material is associated, so as to make the first lamp head 2 and the tube 1 in close contact, which facilitates the LED tube lamps to realize automated production. In this embodiment, the hot-melt adhesive will expand and flow after being heated at high temperature, and will then solidify when cooled. When the hot-melt adhesive is heated from room temperature to a temperature of 200 to 250 degrees Celsius, the volume of the hot-melt adhesive will expand to 1 to 1.3 times its original size. Of course, the selection of components of the hot-melt adhesive of the disclosure is not limited to this, and components that are cured after being heated to a predetermined temperature can also be used. Since the hot-melt adhesive of the disclosure will not cause a decrease in reliability due to the high temperature environment formed by heating components such as the power components, it can prevent the bonding performance between the tube 1 and the first lamp head 2 from decreasing during the using process of the lamp, thereby improving long-term reliability.

Referring to FIGS. 18 and 19, in some embodiments, the length of the first lamp head 2 may be configured to make the overall length of the lamp meet a specific specification after the adaptor device 4 has been assembled. For example, in some embodiments, the first lamp head 2 is proceeded with a shrinkage design to provide an installing space for the length of the adaptor device 4 to be used. Of course, in other embodiments, it is also available to adjust the length of the tube 1 to make the length of the lamp with the adaptor device within a specific range. That is, the length of the adaptor device 4, the lamp head and the tube 1, which have been assembled, is configured to be "d", the length range of d needs to be configured to be within a range between the permitted minimum and the permitted maximum. For example, for a certain T8 light tube, under the condition of no adaptor device 4, its permitted minimum length is 601.2 mm and its maximum length is 604.0 mm, when an adaptor device 4 is installed, its overall length is still configured to be in the range between 601.2 mm and 604.0 mm (including two end points) to make the tube (lamp) with an adaptor device still able to be installed in a standard lamp holder. Detailed size specifications may refer to the standards of USA-ANSI, Europe-IEC and Japan-210924-AC, the overall length of a lamp with an adaptor device 4 meeting one of the standards is available. In some aforementioned embodiments of the disclosure, different connecting portions may be disposed to two opposite ends of the adaptor device 4. In some other embodiments of the disclosure, different connecting portions may be disposed to a side end of the adaptor device 4 at intervals with different angles, so that an electric connection can be implemented by the different installing angles of the adaptor device 4 and the lamp head.

In some other embodiments of the disclosure, the electric connecting member (electric connector) disposed on the adaptor device 4 has a certain amount of expansion, so that the electric connecting member can expand or shrink relative to the adaptor device 4. For example, the first plug 411 in FIG. 19 moves a certain distance toward the adaptor device 4 under the control of known pressure, it will return to the initial position when the pressure disappears, the amount of expansion may be 0-100 mm.

In the specification, the description of the first lamp head 2 may be used for the second lamp head 3. That is, in some embodiments, the first lamp head 2 and the second lamp head 3 may be equivalently replaced.

Obviously, the above-mentioned embodiments of the disclosure are only examples for clearly illustrating the disclosure, but are not intended to limit the implementation of the disclosure. For those of ordinary skill in the art, various obvious changes, readjustments and substitutions can be made without departing from the scope of the disclosure. An exhaustive list of all implementations is neither necessary nor possible. Any modifications, equivalent substitutions and improvements made within the spirit and principles of this disclosure shall be included in the protection scope of the claims of this disclosure.

What is claimed is:

1. An adaptor device comprising:

a shell, comprising:

a first end, comprising a first electric connector, and the first electric connector comprising a first plug and a second receiving recess; and a second end, arranged opposite to the first end, comprising a second electric connector, and the second electric connector comprising an engaging head and a first receiving recess;

wherein the first plug is disposed with a first through hole penetrating through the first electric connector, at least part of a first conductive sheet is disposed in the first through hole and passing through the shell from a side of the first electric connector and extending to the second end and into the first receiving recess, and wherein at least part of a second conductive sheet is disposed in the second receiving recess, the second conductive sheet passes through the shell from a side of the second electric connector and extends to the first end of the shell.

2. The adaptor device of claim 1, wherein the shell is a cylindrical structure, the first end and the second end of the shell are disposed with a first receiving chamber and a second receiving chamber, respectively, at least part of the first electric connector is disposed in the first receiving chamber, and at least part of the second electric connector is disposed in the second receiving chamber.

3. The adaptor device of claim 1, wherein the first electric connector comprises a first base and a conductive end cap, and the conductive end cap caps on the first plug and electrically connects to the second electric connector.

4. The adaptor device of claim 3, wherein the second receiving recess penetrates through from the first base to the second electric connector, the second conductive sheet is extended from an end of the second receiving recess to another end of the second receiving recess, and two ends of the second conductive sheet are separately engaged with the first base and the engaging head.

5. The adaptor device of claim 4, wherein middles of the first plug and the engaging head are disposed with a first through hole which penetrates through, an end of the second conductive sheet is engaged with the second base, and another end of the second conductive sheet is engaged with the first plug, the first plug is formed with a cavity, and the second conductive sheet is extended from the cavity into the first through hole and the first receiving recess.

6. A lamp assembly comprising:

a tube, disposed with lighting components therein;

a lamp head, disposed at ends of the tube, comprising a first lamp head and a second lamp head, the first lamp head being disposed with a circuit board electrically connected with the lighting components, and the lamp head being disposed with a conductive pin electrically connected to the lighting components; and an adaptor device, connected to the lamp head, comprising a first electric connector and a second electric connector, and the first electric connector or the second electric connector being fixed and electrically connected to the conductive pin on the lamp head;

wherein the first lamp head is further disposed with at least one adjusting block which is movable relative to the first lamp head to make the circuit board adjust output power and output color temperature of the lighting components.

7. The lamp assembly of claim 6, wherein the at least one adjusting block comprises a first adjusting block and a second adjusting block, the circuit board is disposed with a first adjusting lever and a second adjusting lever;

wherein the first adjusting block is connected to the first adjusting lever, the first adjusting block is slidable relative to the first lamp head and drives the first adjusting lever to slide relative to the circuit board, so that the circuit board adjusts output power of the lighting components;

wherein the second adjusting block is connected to the second adjusting lever, the second adjusting block is slidable relative to the first lamp head and drives the second adjusting lever to slide relative to the circuit board, so that the circuit board adjusts output color temperature of the lighting components.

8. The lamp assembly of claim 7, wherein the first lamp head is disposed with a first sliding trough, a bottom of the first sliding trough is disposed with a first sliding slot, the first adjusting block comprises a first sliding portion and a first connecting portion fixed at an end of the first sliding portion, the first sliding portion is slidably connected to the first sliding trough, and the first connecting portion passes through the first sliding slot to extend into the first lamp head and connect with the first adjusting lever; the first lamp head is disposed with a second sliding trough, a bottom of the second sliding trough is disposed with a second sliding slot, the second adjusting block comprises a second sliding portion and a second connecting portion fixed at an end of the second sliding portion, the second sliding portion is slidably connected to the second sliding trough, and the second connecting portion passes through the second sliding slot to extend into the first lamp head and connect with the second adjusting lever.

9. The lamp assembly of claim 8, wherein an end of the first connecting portion, which is away from the first sliding portion, is formed with a first holding trough, two side walls of the first holding trough is capable of holding the first adjusting lever, an end of the second connecting portion, which is away from the second sliding portion, is formed with a second holding trough, and two side walls of the second holding trough is capable of holding the second adjusting lever.

10. The lamp assembly of claim 6, wherein a side end of the shell, which is toward the tube, is disposed with two first receiving recesses at an interval, the first receiving recesses are used to accommodate the conductive pin, the conductive pin comprises a first conductive pin and a second conductive pin, a side end of the shell, which is away from the tube, is protrusively disposed with a first plug, the shell is formed with a first through hole, the first through hole passes from a side end toward the tube to an outer surface of the first plug, the electric connector is configured to be a first conductive sheet and a conductive end cap, the first conductive sheet comprises a first conductive portion and a second conductive portion, the first conductive portion is connected to the second conductive portion, two ends of the first conductive portion separately correspond to the two first receiving recesses and are bent and extended into a corresponding one of the first receiving recesses with being in contact with the first conductive pin or the second conductive pin, the second conductive portion passes through the first through hole and is bent outward to be attached on an outer surface of the first plug, and the conductive end cap is fixedly capped on the first plug and is in contact with the second conductive portion.

11. The lamp assembly of claim 6, wherein a side end of the shell, which is toward the tube, is formed with two second receiving recesses for accommodating the conductive pin, the conductive pin comprises a first conductive pin and a second conductive pin, the shell is formed with a second through hole which penetrates through the shell from a side end toward the tube to a side end which is away from the tube, the electric connector is configured to be two second conductive sheets, the second conductive sheets and the second receiving recesses are arranged correspondingly to each other, the second conductive sheet comprises a third conductive portion, a fourth conductive portion and a fifth conductive portion, the fourth conductive portion penetrates through the second through hole, the third conductive portion is connected to a side of the fourth conductive portion, which is toward the tube, and is bent relative to the fourth conductive portion to stretch into the second receiving recess and be in contact with the first conductive pin or the second conductive pin, and the fifth conductive portion is attached on a side of the fourth conductive portion, which is away from the shell, and is bent relative to the fourth conductive portion to be attached on an outer surface of the shell.

12. A lamp assembly comprising:

a tube, each of two ends of the tube comprising a lamp head, at least one of the lamp heads comprising power components, at least part of the power components being disposed in a receiving space of the lamp head, each lamp head complies with a first connection protocol; and an adaptor device, connected to the lamp head, complying with a second connection protocol, the adaptor device electrically connected to the power components, wherein the lamp head comprises a conductive pin protrusively disposed on the lamp head, wherein the adaptor device comprises a shell and an electric connector, an end of the electric connector is electrically connected to the conductive pin, and another end thereof stretches out of a surface of the shell.

13. The lamp assembly of claim 12, wherein the adaptor device comprises a first end and a second end, which are opposite, the first end and the second end are located on two sides of the shell, the electric connector comprises a first electric connector and a second electric connector, the first electric connector is disposed on the first end, and the second electric connector is disposed on the second end.

14. The lamp assembly of claim 13, wherein the lamp head is mechanically and electrically connected to the first electric connector or the second electric connector on the adaptor device through the conductive pin.

15. The lamp assembly of claim 13, wherein the adaptor device is mechanically and electrically connected to a lamp holder through the first electric connector or the second electric connector.

16. The lamp assembly of claim 12, wherein the lamp head comprises at least one adjusting block which is movable relative to the lamp head, and the at least one adjusting block controls output power and output color temperature of the lighting components.

* * * * *